United States Patent
Yuan et al.

(10) Patent No.: US 12,550,123 B2
(45) Date of Patent: Feb. 10, 2026

(54) UPLINK TRANSMISSION CONFIGURATION INDICATION STATE SIGNALING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/758,239

(22) PCT Filed: Feb. 7, 2020

(86) PCT No.: PCT/CN2020/074503
§ 371 (c)(1),
(2) Date: Jun. 30, 2022

(87) PCT Pub. No.: WO2021/155571
PCT Pub. Date: Aug. 12, 2021

(65) Prior Publication Data
US 2023/0025072 A1      Jan. 26, 2023

(51) Int. Cl.
*H04W 72/02*          (2009.01)
*H04W 72/044*         (2023.01)
(Continued)

(52) U.S. Cl.
CPC ......... *H04W 72/02* (2013.01); *H04W 72/046* (2013.01); *H04W 72/23* (2023.01); *H04W 80/02* (2013.01)

(58) Field of Classification Search
CPC ... H04B 7/0413; H04L 5/0025; H04L 5/0053; H04L 5/0094; H04L 5/0096;
(Continued)

(56) References Cited

U.S. PATENT DOCUMENTS 10,849,187 B2 *  11/2020  Tsai .................. H04L 5/0092
11,463,994 B2 *  10/2022  Yang ................. H04L 5/0094
(Continued)

FOREIGN PATENT DOCUMENTS

CN    110475360 A    11/2019
CN    110536435 A    12/2019
(Continued)

OTHER PUBLICATIONS

Samsung, On Beam Management, Measurement and Reporting, 3GPP TSG RAN WG1 Meeting 91, R1-1720290, 15 pages, Nov. 27-Dec. 1, 2017.*
(Continued)

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, radio resource control signaling configuring an uplink transmission configuration indication (TCI) state pool that includes multiple candidate uplink TCI states associated with an uplink resource. The base station may transmit, and the UE may receive, downlink signaling that identifies, among the multiple candidate uplink TCI states included in the uplink TCI state pool, an uplink TCI state to be used to transmit an uplink communication on the uplink resource. Accordingly, the UE may transmit, to the base station, the uplink communication on the uplink resource using an uplink transmit beam based at least in part on the uplink TCI state identified in the downlink signaling. Numerous other aspects are provided.

25 Claims, 7 Drawing Sheets

(51) Int. Cl.
*H04W 72/23* (2023.01)
*H04W 80/02* (2009.01)

(58) Field of Classification Search
CPC ... H04W 72/02; H04W 72/046; H04W 72/23; H04W 72/1268; H04W 72/231; H04W 80/02
See application file for complete search history.

(56) References Cited

U.S. PATENT DOCUMENTS

| | | | | |
|---|---|---|---|---|
| 11,564,218 | B2* | 1/2023 | Zhang | H04W 72/56 |
| 11,606,805 | B2* | 3/2023 | Park | H04L 5/0044 |
| 11,722,183 | B2* | 8/2023 | Cao | H04W 72/046 370/329 |
| 11,902,990 | B2* | 2/2024 | Li | H04B 7/0695 |
| 11,950,245 | B2* | 4/2024 | Yang | H04L 5/001 |
| 11,968,699 | B2* | 4/2024 | Yang | H04L 5/0053 |
| 2019/0141693 | A1* | 5/2019 | Guo | H04L 5/0053 |
| 2019/0222289 | A1 | 7/2019 | John Wilson et al. | |
| 2019/0306924 | A1 | 10/2019 | Zhang et al. | |
| 2019/0387418 | A1 | 12/2019 | Yerramalli et al. | |
| 2021/0084623 | A1* | 3/2021 | Zhang | H04L 5/0023 |
| 2021/0135821 | A1* | 5/2021 | Guan | H04L 5/0048 |
| 2021/0195616 | A1* | 6/2021 | Venugopal | H04W 72/23 |
| 2021/0195624 | A1 | 6/2021 | Venugopal et al. | |
| 2021/0385803 | A1* | 12/2021 | Shi | H04B 7/02 |
| 2022/0109487 | A1* | 4/2022 | Guo | H04B 7/0697 |
| 2022/0345272 | A1* | 10/2022 | Guo | H04W 72/20 |
| 2022/0368493 | A1* | 11/2022 | Yang | H04B 7/0695 |
| 2023/0087394 | A1* | 3/2023 | Yuan | H04W 72/23 370/329 |

FOREIGN PATENT DOCUMENTS

| EP | 4064766 A1 | 9/2022 |
|---|---|---|
| WO | WO-2019095893 A1 | 5/2019 |
| WO | WO-2021133575 A1 | 7/2021 |

OTHER PUBLICATIONS

ZTE et al., Discussion on beam management, 3GPP TSG RAN WG1 Meeting #91, R1-1719533, 11 pages, Nov. 27-Dec. 1, 2017.*
Supplementary European Search Report—EP20917606—Search Authority—The Hague—Oct. 9, 2023.
International Search Report and Written Opinion—PCT/CN2020/074503—ISA/EPO—Nov. 18, 2020.
Samsung: "On Beam Management, Measurement and Reporting", 3GPP TSG RAN WG1 Meeting #91, 3GPP Draft, R1-1720290, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051368939, 15 Pages, Retrieved from the Internet: URL: http://www.3gpp.org/ftp/tsg_ran/WG1_RL1/TSGR1_91/Docs/, http://www.3gpp.org/ftp/tsg_ran/WG1_RL1/TSGR1_91/Docs/, [retrieved on Nov. 17, 2017], Sections 2.1, 2.4, Proposal 7, p. 1, paragraph 2.1—p. 3, paragraph2.3.
ZTE et al., "Discussion on Beam Management", 3GPP Draft, 3GPP TSG RAN WG1 Meeting #90-bis, R1-1717424 Discussion on Beam Management, 3RD Generation Partnership Project (3GPP), Mobile Competence Centre; 650, Route Des Lucioles; F-06921 Sophia-Antipolis Cedex; France, vol. RAN WG1, No. Prague, Czechia; Oct. 9, 2017-Oct. 13, 2017, Oct. 8, 2017 (Oct. 8, 2017), XP051340613, 12 Pages, Retrieved from the Internet: URL:http://www.3gpp.org/ftp/Meetings_3GPP_SYNC/RAN1/Docs/ [retrieved on Oct. 8, 2017], Sections 1, 2.1, 3.1.,4, figure 2.
Taiwan Search Report—TW110103973—TIPO—Aug. 13, 2024.
Ericsson: "On UL Beam Indication", 3GPP TSG-RAN WG1 #90bis, R1-1718747, Prague, Czech Republic, Oct. 9-13, 2017, 4 Pages, Oct. 3, 2017.
ETSI: "5G, NR, Medium Access Control (MAC) Protocol Specification (3GPP TS 38.321 Version 15.8.0 Release 15)", Technical Specification, TS 138 321 V15.8.0, Jan. 2020, 80 Pages.
Samsung: "New WID: Further Enhancements on MIMO for NR", 3GPP TSG RAN Meeting #86, RP-193133, Sitges, Spain, Dec. 9-12, 2019, Dec. 12, 2019, 5 Pages.
Samsung: "On Beam Management, Measurement and Reporting", 3GPP TSG RAN WG1 Meeting #91, R1-1720290, Reno, USA, Nov. 27-Dec. 1, 2017, Nov. 17, 2017, 15 Pages.

* cited by examiner

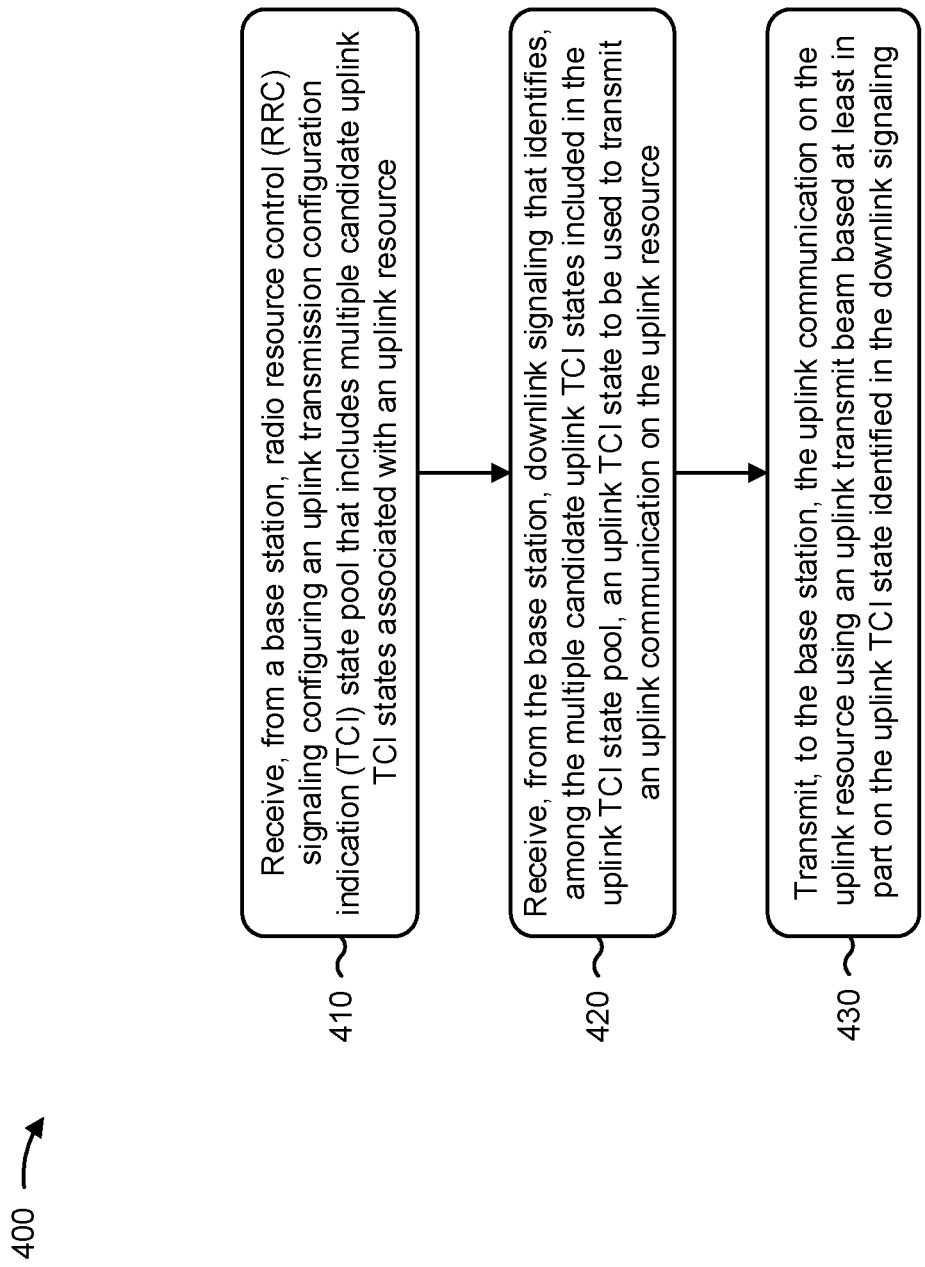

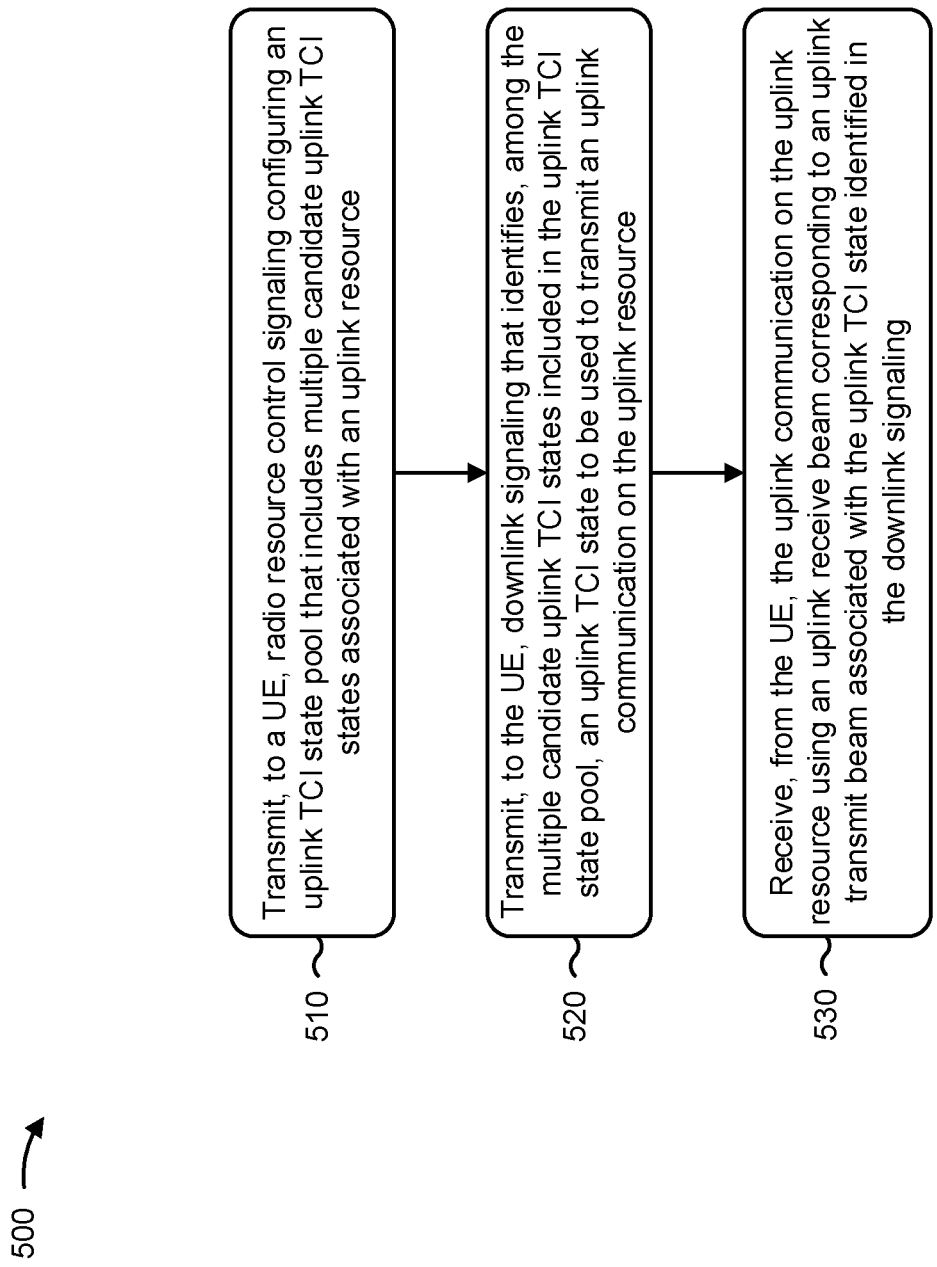

UPLINK TRANSMISSION CONFIGURATION INDICATION STATE SIGNALING

CROSS-REFERENCE TO RELATED APPLICATION

This application is a 371 national stage of Patent Cooperation Treaty (PCT) Application No. PCT/CN2020/074503 filed on Feb. 7, 2020, entitled "UPLINK TRANSMISSION CONFIGURATION INDICATION STATE SIGNALING," which is hereby expressly incorporated by reference herein.

FIELD OF THE DISCLOSURE

Aspects of the present disclosure generally relate to wireless communication and to techniques and apparatuses for uplink transmission configuration indication (TCI) state signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving, from a base station, radio resource control (RRC) signaling configuring an uplink transmission configuration indication (TCI) state pool that includes multiple candidate uplink TCI states associated with an uplink resource; receiving, from the base station, downlink signaling that identifies, among the multiple candidate uplink TCI states included in the uplink TCI state pool, an uplink TCI state to be used to transmit an uplink communication on the uplink resource; and transmitting, to the base station, the uplink communication on the uplink resource using an uplink transmit beam based at least in part on the uplink TCI state identified in the downlink signaling.

In some aspects, a method of wireless communication, performed by a base station, may include transmitting, to a UE, RRC signaling configuring an uplink TCI state pool that includes multiple candidate uplink TCI states associated with an uplink resource; transmitting, to the UE, downlink signaling that identifies, among the multiple candidate uplink TCI states included in the uplink TCI state pool, an uplink TCI state to be used to transmit an uplink communication on the uplink resource; and receiving, from the UE, the uplink communication on the uplink resource using an uplink receive beam corresponding to an uplink transmit beam associated with the uplink TCI state identified in the downlink signaling.

In some aspects, a UE for wireless communication may include a memory and one or more processors operatively coupled to the memory. The memory and the one or more processors may be configured to: receive, from a base station, RRC signaling configuring an uplink TCI state pool that includes multiple candidate uplink TCI states associated with an uplink resource; receive, from the base station, downlink signaling that identifies, among the multiple candidate uplink TCI states included in the uplink TCI state pool, an uplink TCI state to be used to transmit an uplink communication on the uplink resource; and transmit, to the base station, the uplink communication on the uplink resource using an uplink transmit beam based at least in part on the uplink TCI state identified in the downlink signaling.

In some aspects, a base station for wireless communication may include a memory and one or more processors operatively coupled to the memory. The memory and the one or more processors may be configured to transmit, to a UE, RRC signaling configuring an uplink TCI state pool that includes multiple candidate uplink TCI states associated with an uplink resource; transmit, to the UE, downlink signaling that identifies, among the multiple candidate uplink TCI states included in the uplink TCI state pool, an uplink TCI state to be used to transmit an uplink communication on the uplink resource; and receive, from the UE, the uplink communication on the uplink resource using an uplink receive beam corresponding to an uplink transmit beam associated with the uplink TCI state identified in the downlink signaling.

In some aspects, a non-transitory computer-readable medium may store one or more instructions for wireless communication. The one or more instructions, when executed by one or more processors of a UE, may cause the one or more processors to: receive, from a base station, RRC signaling configuring an uplink TCI state pool that includes multiple candidate uplink TCI states associated with an uplink resource; receive, from the base station, downlink signaling that identifies, among the multiple candidate uplink TCI states included in the uplink TCI state pool, an uplink TCI state to be used to transmit an uplink communication on the uplink resource; and transmit, to the base station, the uplink communication on the uplink resource using an uplink transmit beam based at least in part on the uplink TCI state identified in the downlink signaling.

In some aspects, a non-transitory computer-readable medium may store one or more instructions for wireless communication. The one or more instructions, when executed by one or more processors of a base station, may cause the one or more processors to: transmit, to a UE, RRC signaling configuring an uplink TCI state pool that includes multiple candidate uplink TCI states associated with an uplink resource; transmit, to the UE, downlink signaling that identifies, among the multiple candidate uplink TCI states included in the uplink TCI state pool, an uplink TCI state to be used to transmit an uplink communication on the uplink resource; and receive, from the UE, the uplink communication on the uplink resource using an uplink receive beam corresponding to an uplink transmit beam associated with the uplink TCI state identified in the downlink signaling.

In some aspects, an apparatus for wireless communication may include: means for receiving, from a base station, RRC signaling configuring an uplink TCI state pool that includes multiple candidate uplink TCI states associated with an uplink resource; means for receiving, from the base station, downlink signaling that identifies, among the multiple candidate uplink TCI states included in the uplink TCI state pool, an uplink TCI state to be used to transmit an uplink communication on the uplink resource; and means for transmitting, to the base station, the uplink communication on the uplink resource using an uplink transmit beam based at least in part on the uplink TCI state identified in the downlink signaling.

In some aspects, an apparatus for wireless communication may include: means for transmitting, to a UE, RRC signaling configuring an uplink TCI state pool that includes multiple candidate uplink TCI states associated with an uplink resource; means for transmitting, to the UE, downlink signaling that identifies, among the multiple candidate uplink TCI states included in the uplink TCI state pool, an uplink TCI state to be used to transmit an uplink communication on the uplink resource; and means for receiving, from the UE, the uplink communication on the uplink resource using an uplink receive beam corresponding to an uplink transmit beam associated with the uplink TCI state identified in the downlink signaling.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a UE, in accordance with various aspects of the present disclosure.

FIG. 5 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
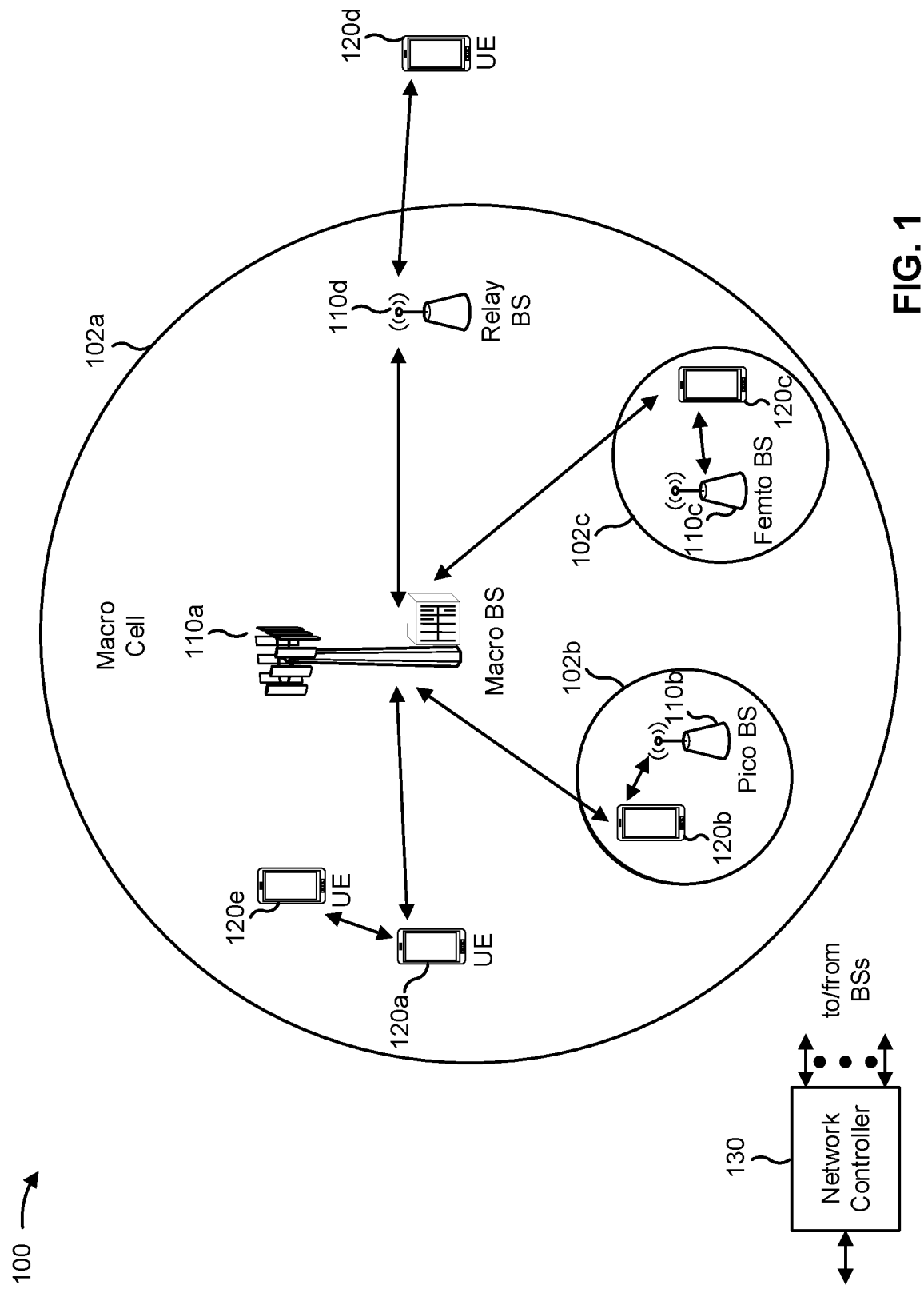
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
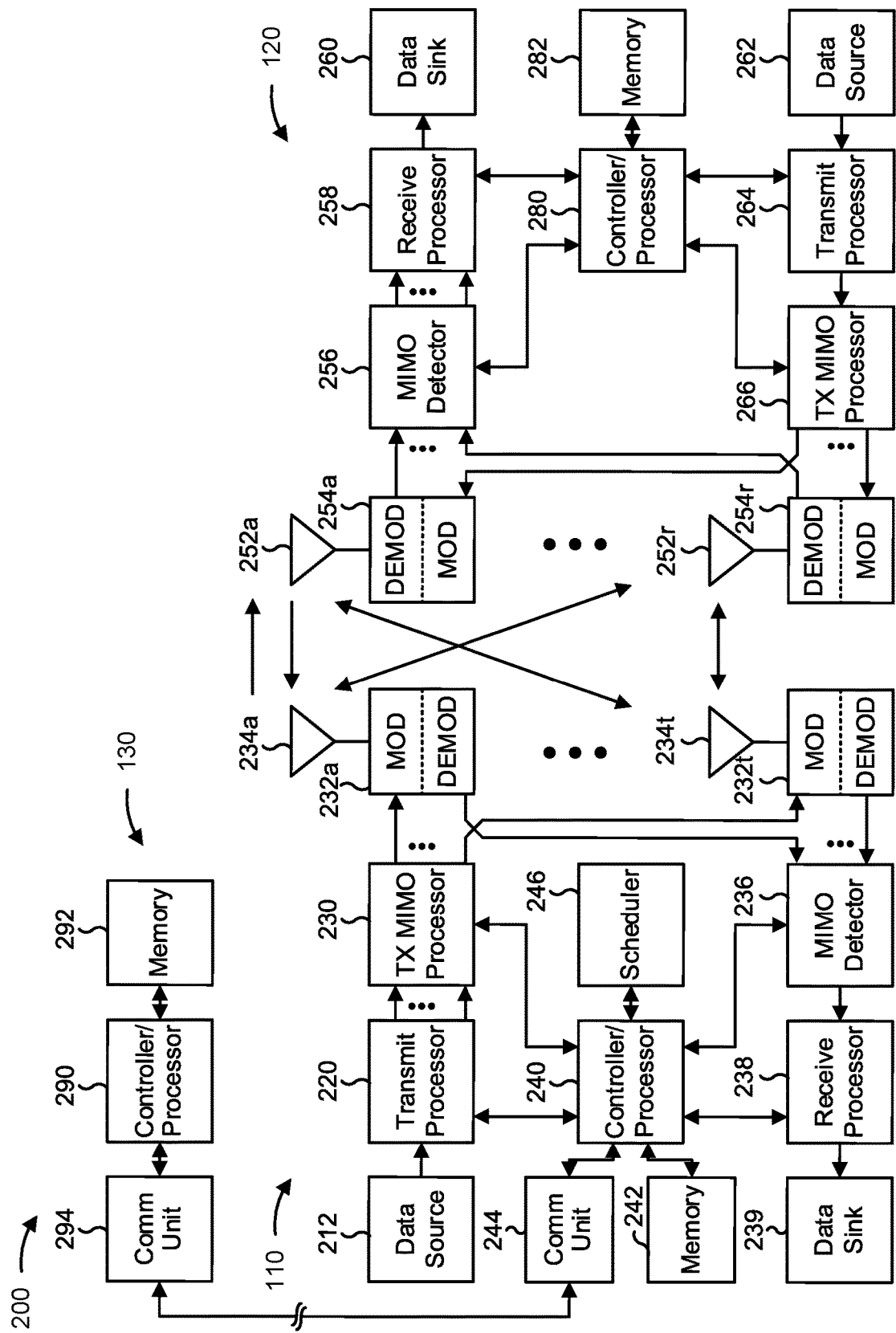
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink transmission configuration indication (TCI) state signaling, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving, from base station 110, radio resource control (RRC) signaling configuring an uplink TCI state pool that includes multiple candidate uplink TCI states associated with an uplink resource, means for receiving, from base station 110, downlink signaling that identifies, among the multiple candidate uplink TCI states included in the uplink TCI state pool, an uplink TCI state to be used to transmit an uplink communication on the uplink resource, means for transmitting, to base station 110, the uplink communication on the uplink resource using an uplink transmit beam based at least in part on the uplink TCI state identified in the downlink signaling, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, RRC signaling configuring an uplink TCI state pool that includes multiple candidate uplink TCI states associated with an uplink resource, means for transmitting, to UE 120, downlink signaling that identifies, among the multiple candidate uplink TCI states included in the uplink TCI state pool, an uplink TCI state to be used to transmit an uplink communication on the uplink resource, means for receiving, from UE 120, the uplink communication on the uplink resource using an uplink receive beam corresponding to an uplink transmit beam associated with the uplink TCI state identified in the downlink signaling, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, base stations, transmit-receive points (TRPs), and/or the like, may communicate with each other using beams. For example, in some cases, a downlink transmission configuration indicator (TCI) state may define a beam according to a downlink transmit beam to be used by a base station, a TRP, and/or the like, and a corresponding downlink receive beam to be used by a UE. In general, a downlink TCI state may indicate a source reference signal and a quasi-co-location (QCL) type to be used for the corresponding beam. For example, the QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, a spatial receive parameter, and/or the like. Accordingly, properties of the beam can generally be derived from the properties of the source reference signal.

Furthermore, on an uplink, a beam is typically defined according to an uplink spatial relation information (SRI) that indicates a spatial domain transmission filter to be used by a UE for a corresponding uplink communication. Accordingly, in this case, the uplink SRI may indicate an uplink transmit beam to be used by a UE and a corresponding uplink receive beam to be used by a base station, a TRP, and/or the like. Additionally, or alternatively, an uplink TCI state may be defined for beamformed uplink communications. In such cases, each valid uplink TCI state configuration may contain a source reference signal to indicate an uplink transmit beam for a target uplink communication (e.g., a target uplink reference signal or a target uplink channel). For example, the source reference signal may be a sounding reference signal (SRS), a synchronization signal block (SSB), a channel state information reference signal (CSI-RS), and/or the like, and the target uplink communication may be a physical random access channel (PRACH), a physical uplink control channel (PUCCH), a physical uplink shared channel (PUSCH), an SRS, a demodulation reference signal (DMRS) (e.g., a DMRS for a PUCCH or a PUSCH), and/or the like. In this way, supporting uplink TCI states may enable a unified TCI framework for downlink and uplink communications, may enable the base station to indicate various uplink QCL relationships for an uplink TCI state (e.g., Doppler shift, Doppler spread, average delay, delay spread, and/or the like), and/or the like. However, signaling techniques to inform a UE about which uplink TCI state is to be activated for a particular uplink communication are not clearly defined, which may prevent a base station and a UE from implementing a unified TCI framework for downlink and uplink communications.

Some aspects described herein relate to techniques and apparatuses whereby a base station may signal, to a UE, information related to an uplink TCI state to be used for uplink communications between the UE and the base station. For example, in some aspects, the base station may transmit, to a UE, one or more radio resource control (RRC) messages that include information to configure an uplink TCI state pool that includes multiple candidate uplink TCI states associated with an uplink resource or an uplink resource set. For example, the uplink TCI state pool may include candidate uplink TCI states that may be used for an uplink reference signal (e.g., an SRS or SRS set), an uplink channel (e.g., a PRACH, a PUCCH, a PUSCH, and/or the like), an uplink reference signal for an uplink channel (e.g., a DMRS for a PUCCH or PUSCH), and/or the like. Furthermore, the base station may transmit, to the UE, downlink signaling that identifies, among the multiple candidate uplink TCI states included in the uplink TCI state pool, an uplink TCI state to be used to transmit an uplink communication on the uplink resource. For example, in some aspects, the downlink signaling may include a medium access control (MAC) control element (MAC-CE) selecting a particular uplink TCI state among the candidate uplink TCI states included in the uplink TCI state pool configured by the RRC messages. Additionally, or alternatively, the downlink signaling may include a MAC-CE to select a subset of the candidate uplink TCI states included in the RRC-configured uplink TCI state pool, and the downlink signaling may further include downlink control information (DCI) to indicate, among the subset of the candidate uplink TCI states selected by the MAC-CE, a particular uplink TCI state to be used for a dynamically scheduled or semi-persistently scheduled uplink communication. In this way, the base station and the UE may communicate on an uplink using an uplink TCI state as part of a unified TCI framework for downlink and uplink communications.

Figure 3A:
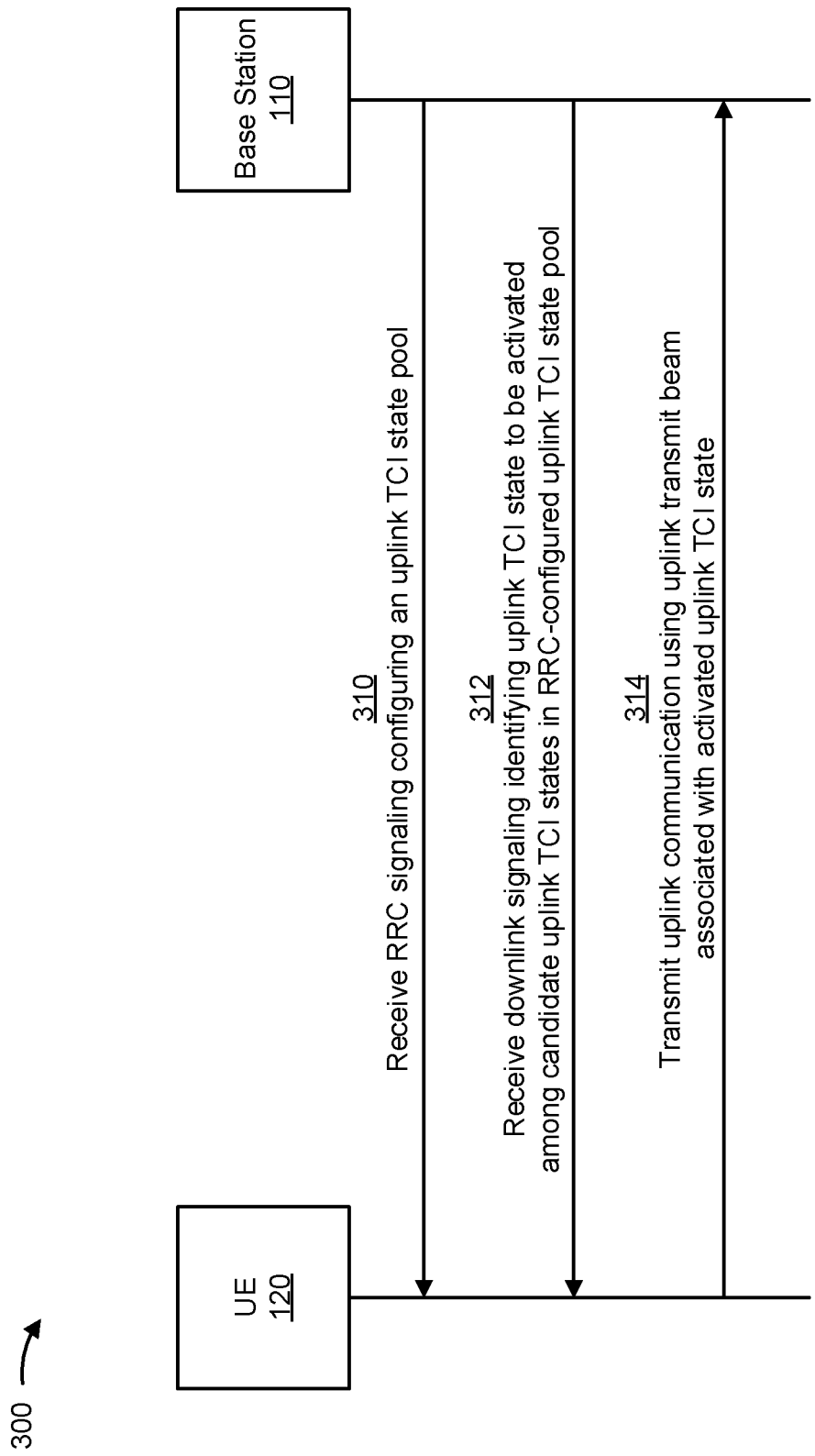
FIGS. 3A-3C are diagrams illustrating one or more examples of uplink transmission configuration indication (TCI) state signaling, in accordance with various aspects of the present disclosure.
Figure 3B:
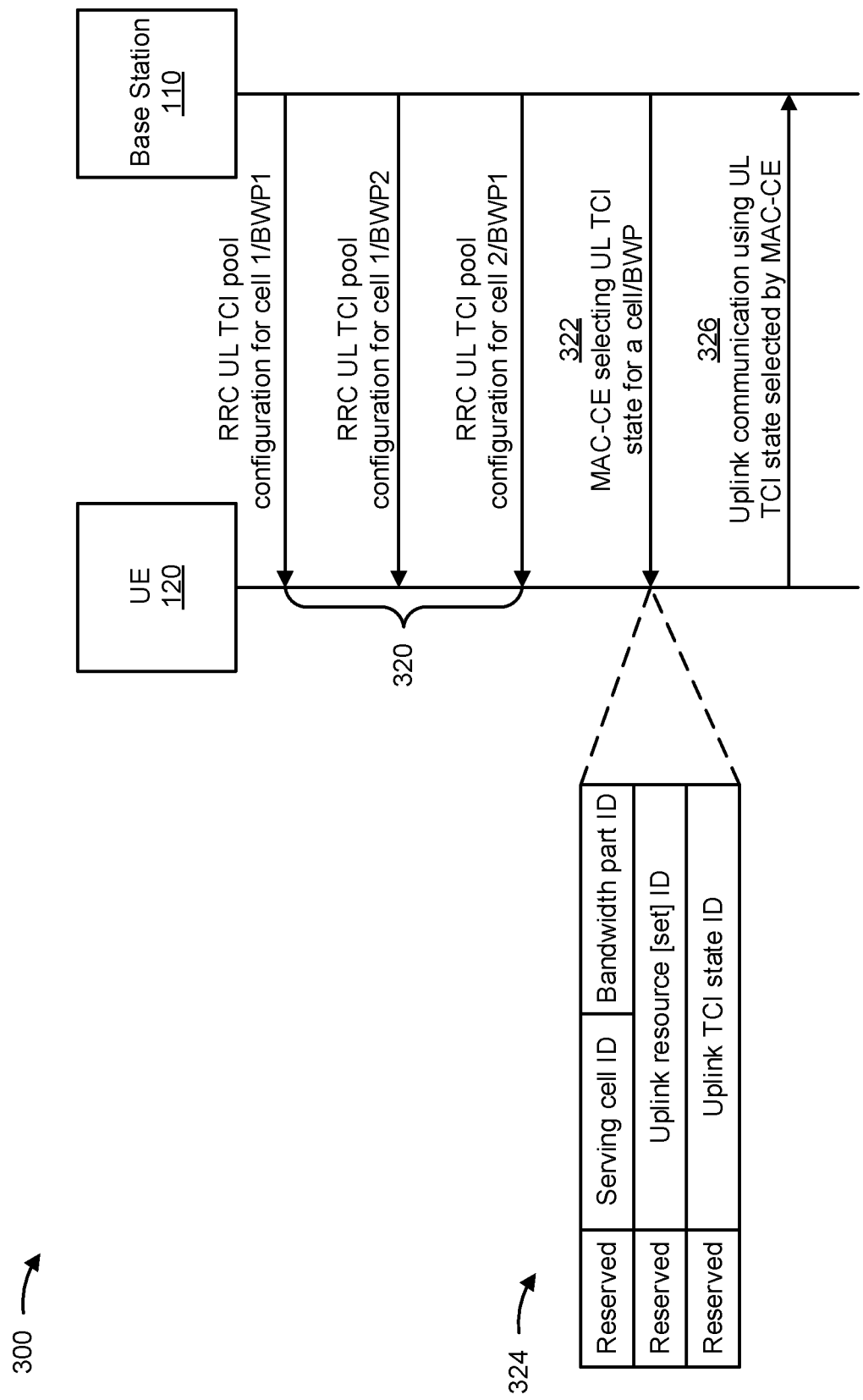
Figure 3C:
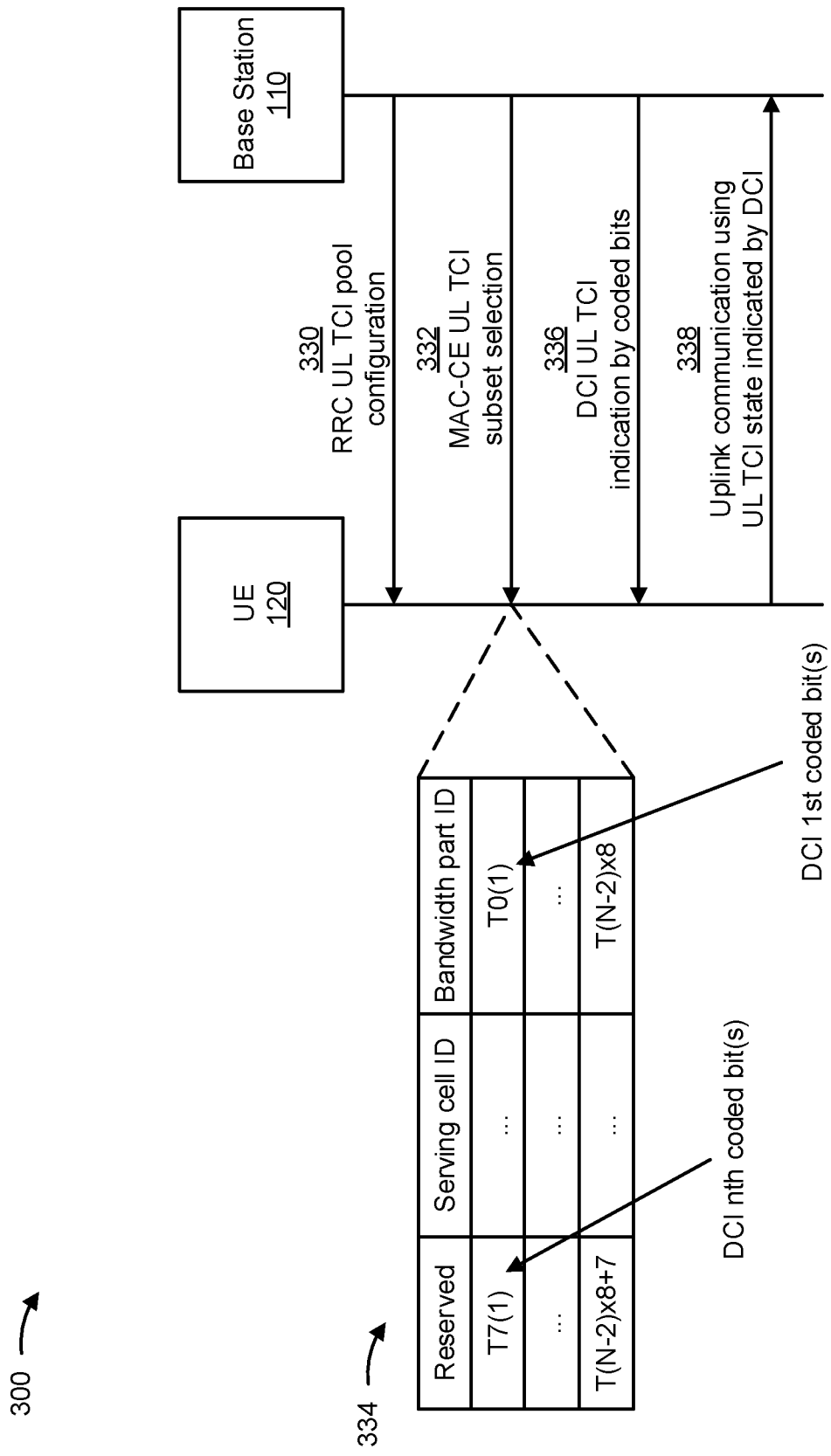

FIGS. 3A-3C are diagrams illustrating one or more examples 300 of uplink TCI state signaling, in accordance with various aspects of the present disclosure. As shown in FIG. 3, example(s) 300 include a UE 120 in communication with a base station 110 over a wireless network (e.g., wireless network 100). In some aspects, as described herein, the UE 120 and the base station 110 may communicate on an uplink using beamformed communications. For example, the UE 120 may use an uplink transmit beam when transmitting an uplink communication, and the base station 110 may use an uplink receive beam corresponding to the uplink transmit beam to receive the uplink communication. In general, the base station 110 may perform uplink beam management to configure, activate, deactivate, or otherwise update the uplink transmit beam and the corresponding uplink receive beam based at least in part on uplink TCI states. For example, the UE 120 may support beamformed uplink communication using uplink TCI states, and downlink signaling from the base station 110 to the UE 120 may be used to indicate a particular uplink TCI state associated with an uplink transmit beam and a corresponding uplink receive beam to be activated and used for uplink communication between the UE 120 and the base station 110.

As shown in FIG. 3A, and by reference number 310, the base station 110 may transmit, and the UE 120 may receive, RRC signaling configuring an uplink TCI state pool. For example, in some aspects, the RRC signaling may include one or more RRC messages, each of which may configure an uplink TCI state pool for a particular uplink resource or resource set. For example, an uplink resource associated with a configured uplink TCI state pool may generally include one or more time and frequency resources (e.g., resource blocks) that the UE 120 can use to transmit an uplink communication (e.g., an uplink reference signal such as an SRS and/or the like, or an uplink channel such as a PRACH, PUCCH, PUSCH, and/or the like). Additionally, or alternatively, an uplink resource set associated with a configured uplink TCI state pool may include a set of time and frequency resources (e.g., a set of resource blocks) that the UE 120 can use to transmit an uplink communication. In some aspects, the uplink TCI state pool for a particular uplink resource or uplink resource set may include information related to multiple candidate uplink TCI states that may be used for the corresponding uplink resource or uplink resource set. For example, in some aspects, each candidate uplink TCI state included in an uplink TCI state pool configuration may contain a source reference signal to indicate an uplink transmit beam for a target uplink communication. For example, the source reference signal may include an uplink reference signal (e.g., an SRS) or a downlink reference signal (e.g., an SSB or CSI-RS), and the target uplink communication may include an uplink reference signal (e.g., an SRS), an uplink channel (e.g., a PRACH, PUCCH, or PUSCH), an uplink reference signal for an uplink channel (e.g., a DMRS for a PUCCH or PUSCH), and/or the like. Furthermore, in some aspects, the uplink TCI state pool for a particular uplink resource or uplink resource set may be associated with an uplink TCI state identifier space specific to a particular bandwidth part, a particular component carrier, and/or the UE 120. An example of RRC signaling to configure uplink TCI state pools for particular bandwidth parts, component carriers, and/or the like is described in more detail below with reference to FIG. 3B.

As further shown in FIG. 3A, and by reference number 312, the base station 110 may transmit, and the UE 120 may receive, downlink signaling identifying an uplink TCI state to be activated from among the candidate uplink TCI states in the RRC-configured uplink TCI state pool. For example, in some aspects, the downlink signaling may include a MAC-CE that selects an uplink TCI state among multiple candidate uplink TCI states in an uplink TCI state pool associated with a particular uplink resource or resource set (e.g., an uplink resource or resource set associated with an SRS, PRACH, PUCCH, PUSCH, and/or another suitable uplink reference signal or uplink channel). An example of using a MAC-CE to identify an uplink TCI state to be activated is described in more detail below with reference to FIG. 3B.

Additionally, or alternatively, in some aspects, the downlink signaling may include a MAC-CE that selects a subset of the candidate uplink TCI states in an RRC-configured uplink TCI state pool associated with a particular uplink resource or resource set and subsequent DCI to indicate a particular uplink TCI state to be activated for a dynamically scheduled or semi-persistently scheduled uplink communication (e.g., an SRS, a PRACH, a PUCCH, a PUSCH, and/or the like). For example, in some cases, the RRC signaling may configure an uplink TCI state pool that includes up to one-hundred twenty-eight (128) candidate uplink TCI states for a particular uplink resource or uplink resource set, and the MAC-CE may include information to select up to eight (8) of the candidate uplink TCI states in the RRC-configured uplink TCI state pool. Accordingly, in this example, the DCI may include three (3) bits to indicate one of the candidate uplink TCI states selected by the MAC-CE that the UE 120 is to use to transmit a dynamically scheduled or semi-persistently scheduled uplink communication. In this case, the DCI may include a downlink and/or uplink TCI state indication, where the indicated TCI state is one of the TCI states selected by the MAC-CE from the RRC-configured pool of candidate TCI states. Furthermore, in some aspects, the TCI state indicated by the DCI may be applied to an uplink reference signal (e.g., an SRS), an uplink channel (e.g., a PRACH, PUCCH, or PUSCH), a downlink reference signal (e.g., a CSI-RS), a downlink channel (e.g., a physical downlink control channel (PDCCH) or physical downlink shared channel (PDSCH)), and/or the like. An example of using DCI to indicate an uplink TCI state to be activated for a dynamically scheduled or semi-persistently scheduled uplink communication from a subset of TCI states selected by a MAC-CE is described in more detail below with reference to FIG. 3C.

As further shown in FIG. 3A, and by reference number 314, the UE 120 may transmit, and the base station 110 may receive, an uplink communication based at least in part on the uplink TCI state activated via the downlink signaling (e.g., via a MAC-CE activating the uplink TCI state from an RRC-configured pool or DCI activating the uplink TCI state from a subset of uplink TCI states selected from an RRC-configured pool by a MAC-CE). For example, in some aspects, the UE 120 may transmit the uplink communication using an uplink transmit beam associated with the activated uplink TCI state, and the base station 110 may receive the uplink communication using an uplink receive beam that corresponds to the uplink transmit beam. Furthermore, as described above, the uplink communication may include an uplink reference signal, an uplink channel, an uplink reference signal for an uplink channel, and/or the like. For example, in some aspects, the uplink communication may include an SRS, a PRACH, a PUCCH, a PUSCH, a DMRS for a PUCCH, a DMRS for a PUSCH, and/or the like.

As shown in FIG. 3B, in some aspects, the base station 110 may provide, to the UE 120, RRC signaling to configure uplink TCI state pools for different bandwidth parts, component carriers, and/or the like and may further provide a MAC-CE to identify an uplink TCI state to be activated for a particular uplink communication. For example, as shown by reference number 320, the RRC signaling may include a first RRC message configuring a first uplink TCI state pool that includes multiple candidate uplink TCI states for a first component carrier (cell 1) in a first bandwidth part (BWP1), a second RRC message configuring a second uplink TCI state pool that includes multiple candidate uplink TCI states for the first component carrier in a second bandwidth part (BWP2), a third RRC message configuring a third uplink TCI state pool that includes multiple candidate uplink TCI states for a second component carrier in the first bandwidth part, and/or the like. Furthermore, as described above, the uplink TCI state pool(s) configured by the RRC message(s) may be for a particular uplink resource or uplink resource set (e.g., a resource or resource set associated with an SRS, PRACH, PUCCH, PUSCH, and/or the like).

In some aspects, as further shown by reference number 322, a MAC-CE may select an uplink TCI state to be activated for a particular uplink communication from the candidate uplink TCI states in the RRC-configured uplink TCI state pools. For example, as shown by reference number 324, the MAC-CE may have a structure including a first field for a serving cell ID (e.g., a component carrier), a second field for a bandwidth part ID, one or more reserved fields, and/or the like. Accordingly, as further shown in FIG. 3B, the MAC-CE may include an identifier associated with a particular uplink resource or uplink resource set (e.g., a resource or resource set associated with an SRS, PRACH, PUCCH, PUSCH, and/or the like) and an identifier associated with an uplink TCI state to be activated for the particular uplink resource or uplink resource set. In some aspects, as described above, the uplink TCI state to be activated may be one of the candidate uplink TCI states in one of the RRC-configured uplink TCI state pools that corresponds to the serving cell ID and bandwidth part ID indicated in the MAC-CE. Accordingly, as further shown by reference number 326, the UE 120 may transmit, and the base station 110 may receive, the uplink communication using the uplink TCI state selected by the MAC-CE. For example, in some aspects, the UE 120 may transmit an uplink reference signal or uplink channel corresponding to the uplink resource (set) identifier included in the MAC-CE using an uplink transmit beam associated with the uplink TCI state identifier further included in the MAC-CE.

As shown in FIG. 3C, in some aspects, the base station 110 may provide, to the UE 120, RRC signaling to configure one or more uplink TCI state pools (e.g., for one or more uplink resources or resource sets, bandwidth parts, component carriers, and/or the like), and downlink signaling including a MAC-CE and DCI may be used to identify an uplink TCI state to be activated for a particular uplink communication. For example, as shown by reference number 330, the RRC signaling may include an uplink TCI state pool configuration that indicates multiple candidate uplink TCI states for a particular uplink resource, resource set, component carrier, bandwidth part, and/or the like. For example, in some aspects, the uplink TCI state pool configuration may include up to 128 candidate uplink TCI states. In some aspects, as further shown by reference number 332, a MAC-CE may select a subset (e.g., up to eight) of the candidate uplink TCI states in the uplink TCI state pool configuration. For example, as shown by reference number 334, the MAC-CE may have a structure including a first field for a serving cell ID (e.g., a component carrier), a second field for a bandwidth part ID, one or more reserved fields, and/or the like. In some aspects, the one or more reserved fields may include a bit having a first value (e.g., zero or one) to indicate that the MAC-CE is to select a subset of downlink TCI states, or a second value (e.g., one or zero) to indicate that the MAC-CE is to select a subset of uplink TCI states.

Furthermore, as shown in FIG. 3C, the MAC-CE may include various fields to indicate the candidate uplink TCI states that are selected by the MAC-CE in cases where the MAC-CE is used to select a subset of uplink TCI states from an RRC-configured uplink TCI state pool. For example, in FIG. 3C, the MAC-CE may include a bitmap in which the expression $Ti=0, \ldots, (N-2) \times 8+7$ corresponds to an identifier associated with a candidate uplink TCI state configured by the RRC signaling, and each bit either has a value of one (1) to indicate that the candidate uplink TCI state is selected by the MAC-CE or a value of zero (0) to indicate that the candidate uplink TCI state is not selected by the MAC-CE.

For example, in FIG. 3C, the candidate uplink TCI state associated with the identifier T7 and the identifier T0 are selected by the MAC-CE. Accordingly, as further shown by reference number 336, the base station 110 may transmit, and the UE 120 may receive, DCI that includes a bit sequence (e.g., a codepoint or other coded bits) indicating an uplink TCI state to be activated for a particular uplink communication. For example, in cases where the MAC-CE selects an uplink TCI state subset that includes eight or fewer RRC-configured candidate uplink TCI states, the DCI may include three (3) bits to indicate one of the uplink TCI states in the selected subset that is to be activated for the uplink communication. Accordingly, as further shown by reference number 338, the UE 120 may transmit, and the base station 110 may receive, the uplink communication using the uplink TCI state indicated in the DCI. For example, in some aspects, the UE 120 may transmit a dynamically scheduled, aperiodic, or semi-persistently scheduled uplink reference signal or uplink channel using an uplink transmit beam associated with the uplink TCI state activated via the DCI (e.g., according to a dynamic grant, a configured grant, and/or the like).

As indicated above, FIGS. 3A-3C are provided as one or more examples. Other examples may differ from what is described with respect to FIGS. 3A-3C.

FIG. 4 is a diagram illustrating an example process 400 performed, for example, by a UE, in accordance with various aspects of the present disclosure. Example process 400 is an example where the UE (e.g., UE 120 and/or the like) performs operations associated with uplink TCI state signaling.

As shown in FIG. 4, in some aspects, process 400 may include receiving, from a base station, RRC signaling configuring an uplink TCI state pool that includes multiple candidate uplink TCI states associated with an uplink resource (block 410). For example, the UE may receive (e.g., using antenna 252, DEMOD 254, MIMO detector 256, receive processor 258, controller/processor 280, memory 282, and/or the like), from a base station, RRC signaling configuring an uplink TCI state pool that includes multiple candidate uplink TCI states associated with an uplink resource, as described above.

As further shown in FIG. 4, in some aspects, process 400 may include receiving, from the base station, downlink signaling that identifies, among the multiple candidate uplink TCI states included in the uplink TCI state pool, an uplink TCI state to be used to transmit an uplink communication on the uplink resource (block 420). For example, the UE may receive (e.g., using antenna 252, DEMOD 254, MIMO detector 256, receive processor 258, controller/processor 280, memory 282, and/or the like), from the base station, downlink signaling that identifies, among the multiple candidate uplink TCI states included in the uplink TCI state pool, an uplink TCI state to be used to transmit an uplink communication on the uplink resource, as described above.

As further shown in FIG. 4, in some aspects, process 400 may include transmitting, to the base station, the uplink communication on the uplink resource using an uplink transmit beam based at least in part on the uplink TCI state identified in the downlink signaling (block 430). For example, the UE may transmit (e.g., using controller/processor 280, transmit processor 264, TX MIMO processor 266, MOD 254, antenna 252, and/or the like), to the base station, the uplink communication on the uplink resource using an uplink transmit beam based at least in part on the uplink TCI state identified in the downlink signaling, as described above.

Process 400 may include additional aspects, such as any single aspect or any combination of aspects described below and/or in connection with one or more other processes described elsewhere herein.

In a first aspect, the downlink signaling comprises a MAC-CE that identifies the uplink TCI state to be used to transmit the uplink communication on the uplink resource.

In a second aspect, alone or in combination with the first aspect, the downlink signaling comprises a MAC-CE selecting a subset of the multiple candidate uplink TCI states in the uplink TCI state pool.

In a third aspect, alone or in combination with one or more of the first and second aspects, the downlink signaling further comprises DCI indicating the uplink TCI state to be used to transmit the uplink communication on the uplink resource among the subset of the multiple candidate uplink TCI states selected by the MAC-CE.

In a fourth aspect, alone or in combination with one or more of the first through third aspects, the DCI further indicates that the uplink TCI state is to be applied to one or more of a PDCCH, a PDSCH, or a CSI-RS.

In a fifth aspect, alone or in combination with one or more of the first through fourth aspects, the DCI includes a bit sequence to indicate the uplink TCI state to be used to transmit the uplink communication.

In a sixth aspect, alone or in combination with one or more of the first through fifth aspects, the MAC-CE includes one or more bits to indicate that the MAC-CE is to select the subset of the multiple candidate uplink TCI states to be used to transmit the uplink communication.

In a seventh aspect, alone or in combination with one or more of the first through sixth aspects, the uplink TCI state pool is associated with one or more of a bandwidth part, a component carrier, or the UE.

In an eighth aspect, alone or in combination with one or more of the first through seventh aspects, the uplink resource includes a set of uplink resources associated with one or more of a PRACH, a PUCCH, a PUSCH, or an SRS.

In a ninth aspect, alone or in combination with one or more of the first through eighth aspects, the uplink resource includes one or more of a PRACH resource, a PUCCH resource, a PUSCH resource, or an SRS resource.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with various aspects of the present disclosure. Example process 500 is an example where the base station (e.g., base station 110 and/or the like) performs operations associated with uplink TCI state signaling.

As shown in FIG. 5, in some aspects, process 500 may include transmitting, to a UE, RRC signaling configuring an uplink TCI state pool that includes multiple candidate uplink TCI states associated with an uplink resource (block 510). For example, the base station may transmit (e.g., using controller/processor 240, transmit processor 220, TX MIMO processor 230, MOD 232, antenna 234, and/or the like), to a UE, RRC signaling configuring an uplink TCI state pool that includes multiple candidate uplink TCI states associated with an uplink resource, as described above.

As further shown in FIG. 5, in some aspects, process 500 may include transmitting, to the UE, downlink signaling that identifies, among the multiple candidate uplink TCI states included in the uplink TCI state pool, an uplink TCI state to be used to transmit an uplink communication on the uplink resource (block 520). For example, the base station may transmit (e.g., using controller/processor 240, transmit processor 220, TX MIMO processor 230, MOD 232, antenna 234, and/or the like), to the UE, downlink signaling that identifies, among the multiple candidate uplink TCI states included in the uplink TCI state pool, an uplink TCI state to be used to transmit an uplink communication on the uplink resource, as described above.

As further shown in FIG. 5, in some aspects, process 500 may include receiving, from the UE, the uplink communication on the uplink resource using an uplink receive beam corresponding to an uplink transmit beam associated with the uplink TCI state identified in the downlink signaling (block 530). For example, the base station may receive (e.g., using antenna 234, DEMOD 232, MIMO detector 236, receive processor 238, controller/processor 240, and/or the like), from the UE, the uplink communication on the uplink resource using an uplink receive beam corresponding to an uplink transmit beam associated with the uplink TCI state identified in the downlink signaling, as described above.

Process 500 may include additional aspects, such as any single aspect or any combination of aspects described below and/or in connection with one or more other processes described elsewhere herein.

In a first aspect, the downlink signaling comprises a MAC-CE that identifies the uplink TCI state to be used to transmit the uplink communication on the uplink resource.

In a second aspect, alone or in combination with the first aspect, the downlink signaling comprises a MAC-CE selecting a subset of the multiple candidate uplink TCI states in the uplink TCI state pool.

In a third aspect, alone or in combination with one or more of the first and second aspects, the downlink signaling further comprises DCI indicating the uplink TCI state to be used to transmit the uplink communication on the uplink resource among the subset of the multiple candidate uplink TCI states selected by the MAC-CE.

In a fourth aspect, alone or in combination with one or more of the first through third aspects, the DCI further indicates that the uplink TCI state is to be applied to one or more of a PDCCH, a PDSCH, or a CSI-RS.

In a fifth aspect, alone or in combination with one or more of the first through fourth aspects, the DCI includes a bit sequence to indicate the uplink TCI state to be used to transmit the uplink communication.

In a sixth aspect, alone or in combination with one or more of the first through fifth aspects, the MAC-CE includes one or more bits to indicate that the MAC-CE is to select the subset of the multiple candidate uplink TCI states to be used to transmit the uplink communication.

In a seventh aspect, alone or in combination with one or more of the first through sixth aspects, the uplink TCI state pool is associated with one or more of a bandwidth part, a component carrier, or the UE.

In an eighth aspect, alone or in combination with one or more of the first through seventh aspects, the uplink resource includes a set of uplink resources associated with one or more of a PRACH, a PUCCH, a PUSCH, or an SRS.

In a ninth aspect, alone or in combination with one or more of the first through eighth aspects, the uplink resource includes one or more of a PRACH resource, a PUCCH resource, a PUSCH resource, or an SRS resource.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a network entity, radio resource control signaling configuring an uplink transmission configuration indication (TCI) state pool that includes multiple candidate uplink TCI states associated with an uplink resource;
   receiving, from the network entity, downlink signaling, comprising a medium access control (MAC) control element (MAC-CE), that selects, among the multiple candidate uplink TCI states included in the uplink TCI state pool, one or more uplink TCI states to be used to transmit an uplink communication on the uplink resource; and
   transmitting, to the network entity, the uplink communication on the uplink resource using an uplink transmit beam based at least in part on the one or more uplink TCI states selected in the downlink signaling.

2. The method of claim 1, wherein the MAC-CE includes a structure including a first field for a serving cell ID, a second field for a bandwidth part ID, and one or more third fields,
   wherein the one or more third fields of the MAC CE indicate that the MAC CE is to select the one or more uplink TCI states,
   wherein the downlink signaling further comprises downlink control information (DCI) indicating the uplink TCI state to be used to transmit the uplink communication on the uplink resource among the one or more uplink TCI states selected by the MAC-CE; and
   wherein the DCI includes a bit sequence to indicate the uplink TCI state to be used to transmit the uplink communication.

3. The method of claim 1, wherein the one or more uplink TCI states comprise a subset of the multiple candidate uplink TCI states in the uplink TCI state pool.

4. The method of claim 3, further comprising:
   receiving downlink control information (DCI) indicating an uplink TCI state, among the one or more uplink TCI states selected by the MAC-CE, to be used to transmit the uplink communication on the uplink resource.

5. The method of claim 4, wherein the DCI further indicates that the uplink TCI state is to be applied to one or more of a physical downlink control channel, a physical downlink shared channel, or a channel state information reference signal.

6. The method of claim 4, wherein the DCI includes a bit sequence to indicate the uplink TCI state to be used to transmit the uplink communication.

7. The method of claim 3, wherein the MAC-CE includes one or more bits to indicate that the MAC-CE is to select the subset of the multiple candidate uplink TCI states to be used to transmit the uplink communication.

8. The method of claim 1, wherein the uplink TCI state pool is associated with one or more of a bandwidth part, a component carrier, or the UE.

9. The method of claim 1, wherein the uplink resource includes a set of uplink resources associated with one or more of a physical random access channel, a physical uplink control channel, a physical uplink shared channel, or a sounding reference signal.

10. The method of claim 1, wherein the uplink resource includes one or more of a physical random access channel resource, a physical uplink control channel resource, a physical uplink shared channel resource, or a sounding reference signal resource.

11. A method of wireless communication performed by a network entity, comprising:
- transmitting, to a user equipment (UE), radio resource control signaling configuring an uplink transmission configuration indication (TCI) state pool that includes multiple candidate uplink TCI states associated with an uplink resource;
- transmitting, to the UE, downlink signaling, comprising a medium access control (MAC) control element (MAC-CE), that selects, among the multiple candidate uplink TCI states included in the uplink TCI state pool, one or more uplink TCI states to be used to transmit an uplink communication on the uplink resource; and
- receiving, from the UE, the uplink communication on the uplink resource using an uplink receive beam corresponding to an uplink transmit beam associated with the one or more uplink TCI states selected in the downlink signaling.

12. The method of claim 11, wherein the uplink resource includes one or more of a physical random access channel resource, a physical uplink control channel resource, a physical uplink shared channel resource, or a sounding reference signal resource.

13. The method of claim 11, wherein the one or more uplink TCI states comprise a subset of the multiple candidate uplink TCI states in the uplink TCI state pool.

14. The method of claim 13, wherein further comprising:
- transmitting downlink control information (DCI) indicating an uplink TCI state, among the one or more uplink TCI states selected by the MAC-CE, to be used to transmit the uplink communication on the uplink resource.

15. The method of claim 14, wherein the DCI further indicates that the uplink TCI state is to be applied to one or more of a physical downlink control channel, a physical downlink shared channel, or a channel state information reference signal.

16. The method of claim 14, wherein the DCI includes a bit sequence to indicate the uplink TCI state to be used to transmit the uplink communication.

17. The method of claim 13, wherein the MAC-CE includes one or more bits to indicate that the MAC-CE is to select the subset of the multiple candidate uplink TCI states to be used to transmit the uplink communication.

18. The method of claim 11, wherein the uplink TCI state pool is associated with one or more of a bandwidth part, a component carrier, or the UE.

19. The method of claim 11, wherein the uplink resource includes a set of uplink resources associated with one or more of a physical random access channel, a physical uplink control channel, a physical uplink shared channel, or a sounding reference signal.

20. A user equipment (UE) for wireless communication, comprising:
- one or more memories comprising processor-executable instructions; and
- one or more processors configured to execute the processor-executable instructions and cause the UE to:
  - receive, from a network entity, radio resource control signaling configuring an uplink transmission configuration indication (TCI) state pool that includes multiple candidate uplink TCI states associated with an uplink resource;
  - receive, from the network entity, downlink signaling, comprising a medium access control (MAC) control element (MAC-CE), that selects, among the multiple candidate uplink TCI states included in the uplink TCI state pool, one or more uplink TCI states to be used to transmit an uplink communication on the uplink resource; and
  - transmit, to the network entity, the uplink communication on the uplink resource using an uplink transmit beam based at least in part on the one or more uplink TCI states selected in the downlink signaling.

21. The UE of claim 20, wherein the one or more uplink TCI states comprise a subset of the multiple candidate uplink TCI states in the uplink TCI state pool.

22. The UE of claim 21, wherein the one or more processors are further configured to cause the UE to:
- receive downlink control information (DCI) indicating an uplink TCI state, among the one or more uplink TCI states selected by the MAC-CE, to be used to transmit the uplink communication on the uplink resource.

23. The UE of claim 22, wherein the DCI includes a bit sequence to indicate the uplink TCI state to be used to transmit the uplink communication.

24. The UE of claim 20, wherein the uplink TCI state pool is associated with one or more of a bandwidth part, a component carrier, or the UE.

25. The UE of claim 20, wherein the MAC-CE includes a structure including a first field for a serving cell ID, a second field for a bandwidth part ID, and one or more third fields,
- wherein the one or more third fields of the MAC CE indicate that the MAC CE is to select the one or more uplink TCI states,
- wherein the downlink signaling further comprises downlink control information (DCI) indicating the uplink TCI state to be used to transmit the uplink communication on the uplink resource among the one or more uplink TCI states selected by the MAC-CE; and
- wherein the DCI includes a bit sequence to indicate the uplink TCI state to be used to transmit the uplink communication.

* * * * *